United States Patent [19]

Stephen et al.

[11] Patent Number: 4,727,853
[45] Date of Patent: Mar. 1, 1988

[54] SEAR GRID FOR PORTABLE GRILL

[75] Inventors: James C. Stephen, Arlington Heights; Charles W. Lohmeyer, Barrington; Erich J. Schlosser, Lindenhurst, all of Ill.

[73] Assignee: Weber-Stephen Products Co., Palatine, Ill.

[21] Appl. No.: 763,858

[22] Filed: Aug. 8, 1985

[51] Int. Cl.⁴ .................................................. A47J 37/00
[52] U.S. Cl. ........................................ 126/41 R; 99/444
[58] Field of Search ................ 126/25 R, 39 R, 41 R; 99/425, 444, 445

[56] References Cited

U.S. PATENT DOCUMENTS

| 923,348 | 6/1909 | Fey | 126/41 R |
|---|---|---|---|
| 1,103,992 | 7/1914 | Murray | 126/41 R |
| 1,133,850 | 3/1915 | Garraux | 126/41 R |
| 2,722,883 | 11/1955 | Rignell | 126/25 R X |
| 2,903,549 | 9/1959 | Joseph | 219/35 |
| 2,905,077 | 9/1959 | Del Francia | 99/446 |
| 3,348,472 | 10/1967 | Anethsberger et al. | 99/447 |
| 3,396,716 | 8/1968 | Weyland | 126/41 R |
| 3,418,921 | 12/1968 | Faultz | 99/445 |
| 3,586,518 | 6/1971 | Folmar | 99/445 |
| 3,771,510 | 11/1973 | Short | 126/41 R |
| 3,989,028 | 11/1976 | Berger | 126/41 R |
| 4,321,857 | 3/1982 | Best | 99/340 |
| 4,402,300 | 9/1983 | Houck | 126/41 R |

FOREIGN PATENT DOCUMENTS

| 240951 | 1/1960 | Australia | 126/41 R |
|---|---|---|---|
| 0602071 | 7/1978 | Switzerland | 126/25 R |

Primary Examiner—Margaret A. Focarino
Attorney, Agent, or Firm—Robert E. Wagner; Ralph R. Rath

[57] ABSTRACT

A sear bar for evaporating greases in an outdoor gas grill consists of an inverted V-shaped member having a pair of flat inclined walls defining an included angle of less than 90° so that grease will evaporate while flowing across the heated inclined walls.

7 Claims, 3 Drawing Figures

SEAR GRID FOR PORTABLE GRILL

TECHNICAL FIELD

The present invention relates generally to portable cooking grills and, more particularly, to gas grills.

BACKGOUND PRIOR ART

Portable gas grills have become very popular as outdoor cooking devices, and usually consist of a cart supported on wheels and has a cooking vessel supported thereon. The cooking vessel usually has gas burners in the lower portion of the vessel with a grid structure above the gas burners that supports a heat-absorbing material, such as lava rock. A cooking grid is positioned above and spaced from the lava rock. The lava rock is a porous heat-absorbing material which absorbs the heat from the gas burner and thereafter provides the heat for cooking the food.

One of the problems with the lava rock is the fact that any greases dripping from the foods being cooked impinge on the lava rock and have a tendency to ignite, producing flare-ups which can ruin the food being cooked. Another problem is the fact that the lava rock absorbs the grease and, thus, becomes rather unsightly.

A further objection to the use of lava rock is the length of time required for heating the rock to a temperature sufficient for cooking and also the time required for cooling the lava rock after the food has been cooked. An additional problem with lava rock is that it is expensive and must be replaced periodically.

SUMMARY OF THE INVENTION

According to the present invention, a new device has been developed to replace the lava rock conventionally used in gas grills, and the device is designed such that most of the grease drippings are evaporated, without any possibility of uncontrolled flare-ups during the cooking process.

According to the primary aspect of the invention, the gas grill incorporates at least one sear bar that is constructed of a good heat-conductive material and consists of a generally inverted, V-shaped member that has a pair of opposed walls which define an included angle of less than 90°, and preferably about 50° to about 80°. The sear bar is positioned above the burner unit and is spaced from and covers the burner unit.

A plurality of inverted V-shaped members are utilized to define a sear grid located above the gas burners. Each of the sear bars could be formed from cold-rolled steel, which preferably has a porcelain coating thereon, so that the sear bars are easy to clean.

BRIEF DESCRIPTION OF SEVERAL VIEWS OF DRAWINGS

FIG. 3 is an enlarged cross-sectional view of one burner tube and a spaced sear bar.

DETAILED DESCRIPTION

Figure 1:
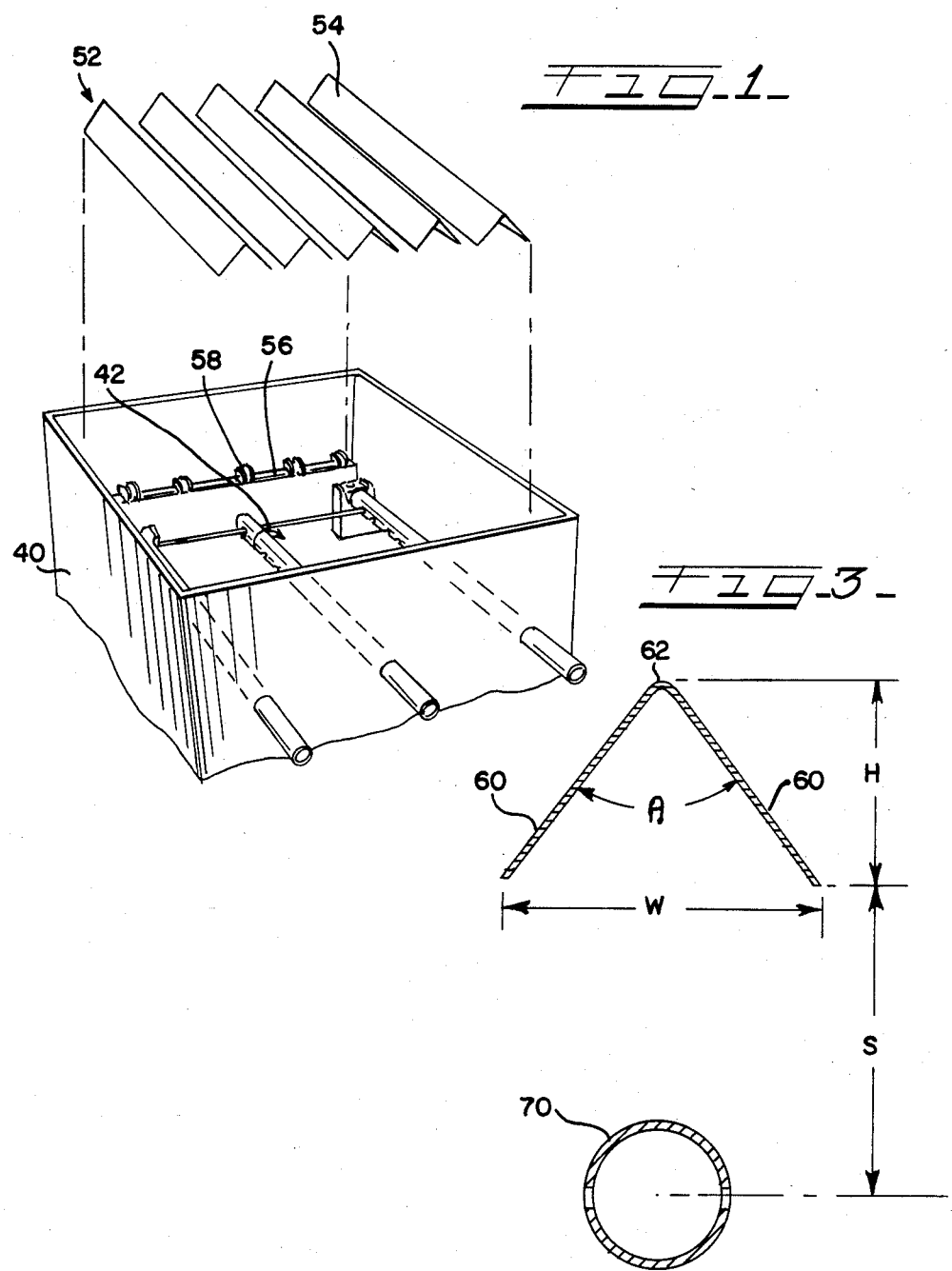
FIG. 1 is an exploded perspective view of a portable gas grill having the present invention incorporated therein.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a gas grill consisting of a lower firebox 40 having a burner assembly 42 in the lower portion and a cooking grid 44 adjacent the upper edge.

The grill illustrated in FIG. 1 is of the type disclosed in co-pending application Ser. No. 759,531, filed July 26, 1985 and assigned to the Assignee of the present invention. The details of this application are incorporated herein by reference.

The grill has a sear grid 52 formed from a plurality of identical sear bars 54, which rest on ledges 56. The ledges 56 have positioning devices 58 for maintaining a predetermined spacing between each of the sear bars 54. Each sear bar 54 includes first and second flat, inclined walls 60 that merge in an apex 62 and define an included angle A. The sear bars 54 are preferably formed from a cold-rolled steel having a porcelain enamel coating on the surfaces thereof. The walls 60 define an included angle A of less than 90° and preferably about 75°.

Figure 2:
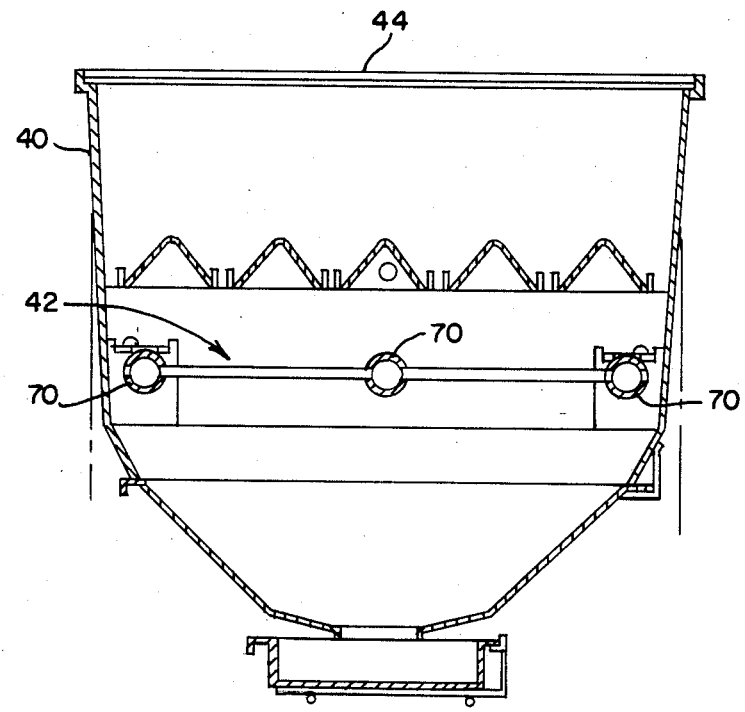
FIG. 2 is a cross-sectional view.

The burner assembly 42 includes three elongated burner tubes 70 that are transversely spaced from each other, as shown in FIGS. 1 and 2. Thus, the sear grid requires at least three sear bars, each positioned directly above and covering a burner tube.

FIG. 3 shows the necessary critical spacing between the sear bar and the lower burner tube 70. As indicated above, it is important that each sear bar be spaced above a burner tube and have a sufficient transverse dimension to fully cover the burner tube with significant overlap so that the grease will not impinge directly onto the flames.

In the commercial embodiment that will be marketed, the angle A is about 75° and the height H of the sear bar is about 1⅜ inches, while the width W between the lower edges is about 2 3/16 inches. The lower edges of the sear bar are spaced from the center of the burner by a spacing S which is about 2 inches and more specifically 2⅛ inches, so that the apex 62 is located about 3½ inches from the center of the tube.

It has been found that while only three sear bars are necessary for the practice of the present invention, a more uniform heat distribution is obtained by using five closely-spaced sear bars to define the sear grid. Furthermore, even more uniform heat distribution is obtained at the cooking grid by using a second sear grid consisting of sear bars extending tranversely of the first set.

Actual tests have shown that the sear bar will heat-up quickly so that the grill is ready for cooking in a matter of minutes after the burner is lit. The sear bar also provides more uniform temperature than prior-known lava rock or other equivalent materials. The sear bar can be manufactured at a fraction of the cost, when compared with lava rock, and its lifespan is indefinite.

Also, the specific dimensions and angles and the number of sear bars may be varied without departing from the scope of the invention so long as sear bars totally cover each of the burner tubes, which could also be of different configurations.

We claim:

1. In combination with a gas grill including a cooking vessel having a housing with a burner assembly including a plurality of elongated burner tubes adjacent a lower end of said housing and a cooking grid spaced above said burner assembly with the grid adapted to support food products that produce grease drippings during the cooking process and direct said grease drippings toward said lower end, the improvement of a sear grid located between said burner assembly and said cooking grid, said sear grid comprising a plurality of sear bars at least equal in number to said burner tubes and having lower edges spaced above said burner assembly, said housing having support means in opposed walls with said support means including positioning means so that at least one of said sear bars is positioned directly over and covers a burner tube, each sear bar comprising an inverted V-shaped member having first and a second flat inclined walls merging in an upper apex with the upper apex lying directly above each said burner tube and defining an included angle of less than 90° to define outwardly-inclined flat surfaces for receiving and vaporizing grease drippings while flowing along said inclined surfaces and preventing uncontrolled flare-ups during the cooking process.

2. The combination as defined in claim 1, in which said included angle is about 75°.

3. The combination as defined in claim 1, in which said burner assembly includes three elongated transversely-spaced burner tubes and at least an equal number of sear bars, respectively covering a burner tube.

4. The combination as defined in claim 3, in which said sear bars have lower edges spaced about two inches above the centers of said tubes and said included angle is about 75°.

5. The combination as defined in claim 4, in which said sear bars have a height of about 1⅜ inches.

6. The combination as defined in claim 1, in which said V-shaped member is formed from steel having a porcelain coating thereon and said angle is about 75°.

7. The combination as defined in claim 3, in which the sear bars covering the respective burner tubes are transversely spaced from each other with an additional two sear bars respectively located between respective pairs of sear bars covering respective burner units.

* * * * *